Mead & Starbuck,
Provision Safe.
No. 107,395.  Patented Sep. 13, 1870.
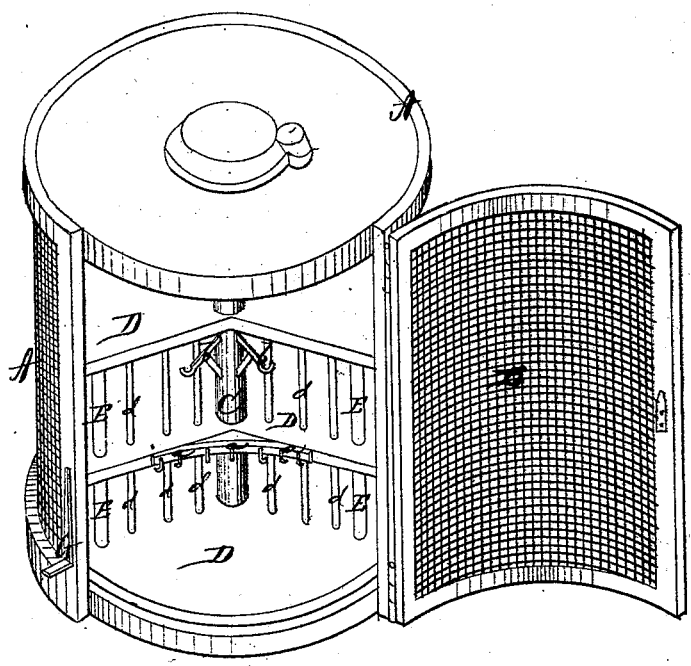
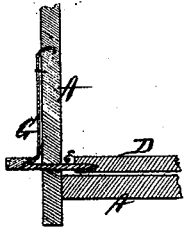
Witnesses
C. L. Evert.
J. E. Hutchinson
Inventor
Wart Mead
George Starbuck
per Alexander Mason
Atty.

United States Patent Office.

WAIT MEAD AND GEORGE E. STARBUCK, OF CHESTERTOWN, NEW YORK.

Letters Patent No. 107,395, dated September 13, 1870.

IMPROVED PROVISION-SAFE.

The Schedule referred to in these Letters Patent and making part of the same

To all whom it may concern:

Be it known that we, WAIT MEAD and GEORGE E. STARBUCK, of Chestertown, in the county of Warren and in the State of New York, have invented certain new and useful Improvements in Provision-Safes; and do hereby declare that the following is a full, clear, and exact description thereof, reference being had to the accompanying drawing and to the letters of reference marked thereon making a part of this specification.

The nature of our invention consists in the construction and arrangement of a "revolving center fly-proof provision-safe," as will be hereinafter fully set forth.

In order to enable others skilled in the art to which our invention appertains to make and use the same, we will now proceed to describe its construction and operation, referring to the annexed drawing, in which—

Figure 1 is a perspective view of our safe, with the door thrown open, and

Figure 2 is a section thereof, showing the device for holding the revolving shelves stationary.

A represents a cylindrical wire-cloth casing, provided with a hinged door, B, of similar material.

Through the center of this casing passes an upright shaft, C, having its bearings in the top and bottom thereof.

On this shaft are secured circular shelves, D D, one above the other, and connected, near their edges, by means of two or more upright rods, E E, passing through them.

All of these shelves, with the exception of the bottom one, are cut out for a distance corresponding with about the width of the door B, at their edges inward toward the shaft, leaving an open space where hooks, $a\,a$ and $b\,b$, are arranged, as shown, for hanging up meats or any other articles. These shelves D D, with the shaft C, are easily revolved, so as to bring any part thereof opposite to the door of the casing.

The space cut out from the shelves is separated from the other part by upright wires, $d\,d$, forming a grating, as shown.

On the outside of the casing A is attached a spring bar, G, having a point, $e$, passing through the same into holes made in the edge of the bottom shelf, D, thus holding all the shelves stationary at any point desired.

Having thus fully described our invention,

What we claim as new, and desire to secure by Letters Patent, is—

1. The arrangement, within the cylindrical wire-cloth casing A, of the upright shaft C, with circular shelves D D, the upper shelves being cut out, as shown and described, and provided with grating $d$ and hooks $a\,b$, substantially as herein set forth.

2. In combination with the cylindrical wire-cloth casing A and revolving shelves D, the spring bar G, with point $e$, substantially as and for the purposes herein set forth.

In testimony that we claim the foregoing, we have hereunto set our hands this 24th day of June, 1870.

WAIT MEAD.
GEORGE E. STARBUCK.

Witnesses:
J. H. WALKER,
F. G. DUDLEY.